United States Patent
Gotta et al.

(10) Patent No.: US 9,558,298 B2
(45) Date of Patent: Jan. 31, 2017

(54) METHOD FOR THE APPROXIMATE MATCHING OF REGULAR EXPRESSIONS, IN PARTICULAR FOR GENERATING INTERVENTION WORKFLOWS IN A TELECOMMUNICATION NETWORK

(75) Inventors: Danilo Gotta, Turin (IT); Daniela Long, Turin (IT); Marisa Porta, Turin (IT); Giulio Valente, Nichelino (IT)

(73) Assignee: Telecom Italia S.p.A., Milan (IT)

( * ) Notice: Subject to any disclaimer, the term of this patent is extended or adjusted under 35 U.S.C. 154(b) by 1009 days.

(21) Appl. No.: 12/087,239

(22) PCT Filed: Dec. 28, 2005

(86) PCT No.: PCT/EP2005/014068
§ 371 (c)(1),
(2), (4) Date: Sep. 25, 2008

(87) PCT Pub. No.: WO2007/073759
PCT Pub. Date: Jul. 5, 2007

(65) Prior Publication Data
US 2009/0030904 A1 Jan. 29, 2009

(51) Int. Cl.
*G06F 17/30* (2006.01)
(52) U.S. Cl.
CPC .............. *G06F 17/30985* (2013.01)
(58) Field of Classification Search
CPC ................................ G06F 17/30985
See application file for complete search history.

(56) References Cited

U.S. PATENT DOCUMENTS 5,826,239 A 10/1998 Du et al.
6,373,971 B1* 4/2002 Floratos ............... G06K 9/62
382/129

(Continued)

FOREIGN PATENT DOCUMENTS

GB  2 411 314 A  8/2005
WO  WO-01/84329 A1  11/2001

(Continued)

OTHER PUBLICATIONS

Corley; "Communications Management Process Integration Using Software Agents: A Specification of a Framework for Agent Oriented Workflow Management Systems", Eurescom Participants Project, XP002343307, vol. 2 of 3: Framework Specification, P815, pp. 1-92, 2001.

(Continued)

*Primary Examiner* — Mahesh Dwivedi
*Assistant Examiner* — Johnese Johnson
(74) *Attorney, Agent, or Firm* — Finnegan, Henderson, Farabow, Garrett & Dunner, L.L.P.

(57) ABSTRACT

A list of elements in a set of elements is matched by means of regular expressions that define respective groups of elements in the set by approximately matching by means of the regular expressions the list of elements by locating recurrences of the regular expressions in the list of elements with a maximum number of matching errors. The matching errors correspond to insertions deriving from the superposition of groups of elements related to different regular expressions. Each time the recurrence of one regular expression is located in the list, the group of elements defined by the regular expression thus located is removed from the list, while leaving in the list those elements corresponding to errors. The approximate matching can be performed by representing each regular expression in terms of Glushkov (Continued)

automata. The method is applicable, e.g., for generating workflows related to interventions on equipment such as equipment included in a telecommunication network or to attacks attempted against such equipment.

19 Claims, 5 Drawing Sheets

(56) References Cited

U.S. PATENT DOCUMENTS

| | | |
|---|---|---|
| 6,571,230 B1 | 5/2003 | Parida |
| 2002/0032769 A1 | 3/2002 | Barkai et al. |
| 2002/0082886 A1 | 6/2002 | Manganaris et al. |
| 2003/0088810 A1* | 5/2003 | Marshall ............ G06F 11/3624 714/38.1 |
| 2004/0010505 A1 | 1/2004 | Vishnubhotla |
| 2004/0044542 A1 | 3/2004 | Beniaminy et al. |
| 2004/0254768 A1 | 12/2004 | Kim et al. |
| 2004/0268304 A1* | 12/2004 | Kuo ..................... G06F 8/33 717/109 |
| 2005/0080763 A1* | 4/2005 | Opatowski ....... G06F 17/30985 |
| 2006/0085689 A1* | 4/2006 | Bjorsne .............. G06F 11/0748 714/39 |
| 2006/0149558 A1* | 7/2006 | Kahn et al. .................. 704/278 |
| 2006/0271526 A1* | 11/2006 | Charnock et al. ................ 707/3 |

FOREIGN PATENT DOCUMENTS

| | | |
|---|---|---|
| WO | WO 2005/018249 A1 | 2/2005 |
| WO | WO 2007/016934 A1 | 2/2007 |
| WO | WO 2007/073757 | 7/2007 |

OTHER PUBLICATIONS

Hollingsworth; "Workflow Management Coalition, The Workflow Reference Model", The Workflow Management Coalition Specification, XP002218704, pp. 1-55, 1995.

Gotta et al.; "A Method for the Automatic Generation of Workflow Models, in Particular for Interventions in a Telecommunication Network", U.S. Appl. No. 12/087,112, filed Dec. 3, 2008.

Fischer, G. et al., "Knowledge Management: Problems, Promises, Realities, and Challenges," IEEE Intelligence System, Jan./Feb., pp. 60-72, (2001).

Van Der Aalst, W. M. P., et al., "Workflow Mining: A Survey of Issues and Approaches," vol. 47, No. 2, pp. 237-267, (2003).

Herbst, J. et al., "Integrating Machine Learning and Workflow Management to Support Acquisition and Adaptation of Workflow Models," International DEXA (Database and Expert System Application) Conference, 8 Pages, (1998).

Navarro, G., "NR-GREP: A Fast and Flexible Pattern matching Tool," Software Practice and Experience (SPE), vol. 31, pp. 1-49, (2001).

Wu, S. et al., "Fast Text Searching with Errors," Communication of ACM, vol. 35, No. 10, pp. 1-17, (1992).

Berry, G. et al., "From Regular Expression to Deterministic Automata," Theoretical Computer Science, vol. 48, abstract and pp. 1-8, (1987).

Aho, A. V. et al., "Design of a Lexical Analyzer Generator," Compilers: Principles, Techniques, and Tools, Addison-Wesley, Section 3.8, pp. 128-124, (1986).

Navarro, G., "A Guided Tour to Approximate String Matching," ACM Computing Surveys, ACM, vol. 33, No. 1, pp. 31-88, XP002235679, (Mar. 1, 2001).

* cited by examiner

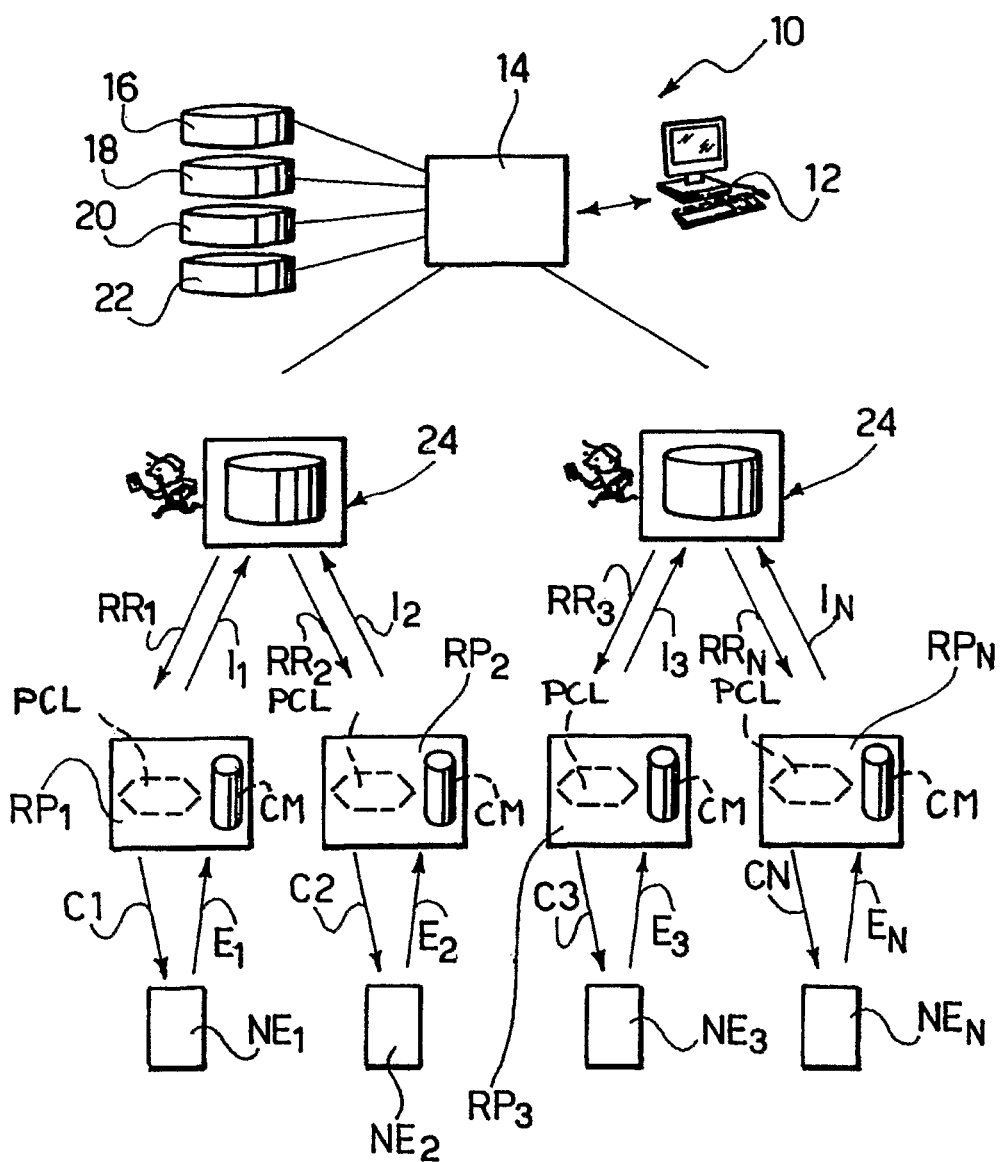
Fig_1

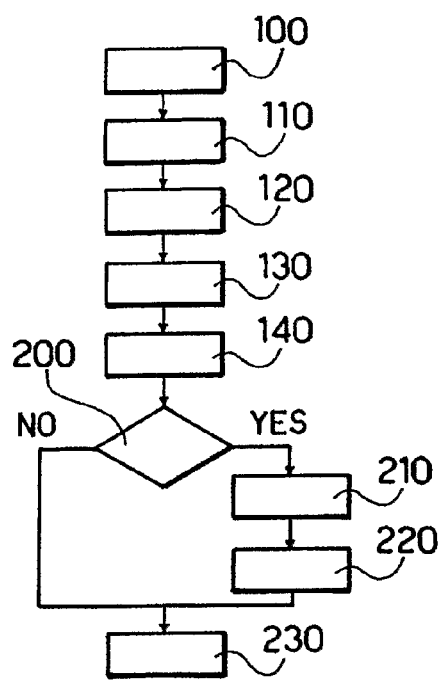
Fig._2
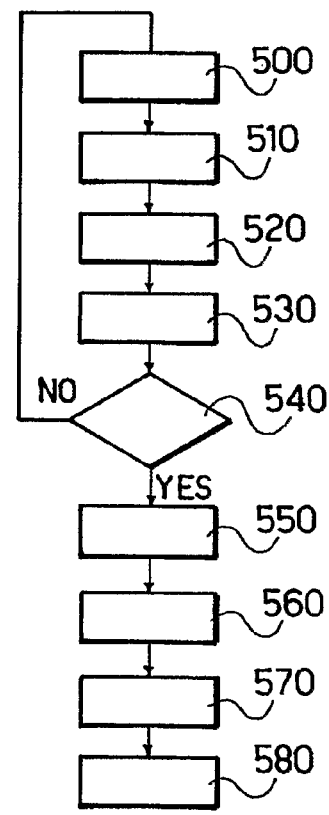
Fig._3

Fig_7
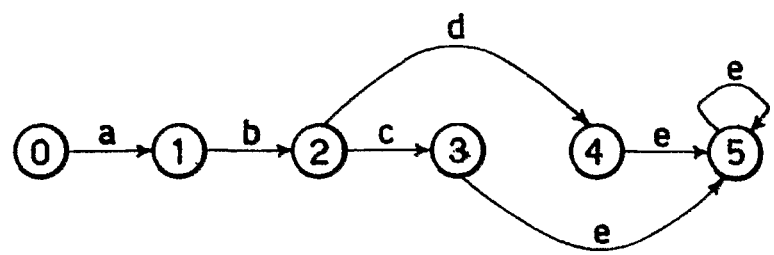
Fig_8
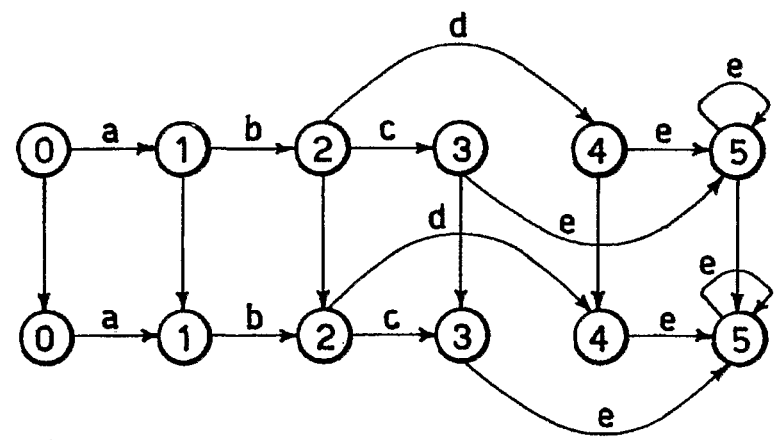

METHOD FOR THE APPROXIMATE MATCHING OF REGULAR EXPRESSIONS, IN PARTICULAR FOR GENERATING INTERVENTION WORKFLOWS IN A TELECOMMUNICATION NETWORK

CROSS REFERENCE TO RELATED APPLICATION

This application is a national phase application based on PCT/EP2005/014068, filed Dec. 28, 2005.

FIELD OF THE INVENTION

The invention relates to a method for the approximate matching of regular expressions, in particular for the automatic generation of workflow models related to interventions on equipments.

The invention was developed with specific attention paid to its possible use in communication networks, e.g. in the context of distributed platforms for management and support to the operation of the workforce.

DESCRIPTION OF THE RELATED ART

The operational knowledge related to interventions in the networks management field constitutes a precious knowledge for telecommunications companies. For that reason, a difficulty for companies, such as telecommunication network operators, is to effectively manage this knowledge making it a corporate asset and not only knowledge for few.

The problem is therefore to make explicit, formalize, structure the tacit (operational) knowledge of the individuals. To this day the Knowledge Management (KM) field has supplied a valid support for companies that wanted to manage their own know-how.

Traditional Knowledge Management solutions, as described in the article "KNOWLEDGE MANAGEMENT: PROBLEMS, PROMISES, REALITIES AND CHALLENGES", G. Fischer and J. Ostwald, in IEEE Intelligence System, January/February, pages 60-72, 2001 are based on a "top-down" approach in which knowledge is first coded (usually by the knowledge managers) as company standards and then provided to the final users. In particular, the captioned article describes at the macro-stage level how the traditional approaches to the Knowledge Management handle the problem of managing, coding and distributing knowledge as a cognitive company asset. Furthermore the article highlights the limitations that the traditional Knowledge Management approaches have when they are applied in an operational context, such as for example the context of telecommunications.

The field of the Operational Knowledge Management (OKM) has, in the recent years, established itself as an extension of the traditional Knowledge Management perspective. Typical OKM system users are the field engineers of a company and Call Center advisors.

A typical example of OKM system is provided by US-A-2004/0044542, which describes a method and system for capturing and sharing knowledge to support the problem-solving activities, using Case-based Reasoning and Model-based Reasoning techniques.

On the other hand, an extensive literature exists relating to automatic workflow derivation. An example is the article, "WORKFLOW MINING: A SURVEY OF ISSUES AND APPROACHES", W. M. P. van der Aalst, B. F. van Dongen, J. Herbst, L. Maruster, G. Schimm and A. J. M. M. Weijters, in Data and Knowledge Engineering, 47 (2), pages 237-267, 2003. The related techniques are mainly directed towards the mining of workflow models obtained from the so-called workflow logs. The latter are generated during the execution of the workflows previously defined. The methodology called workflow mining has the purpose of improving (re-engineering) workflows that have been defined a-priori. Execution of the workflows in these cases is monitored by recording the transitions in a workflow log that is the input of a mining algorithm whose purpose is to rebuild the workflow model. Specifically, the above-mentioned article describes a method for workflow mining based on Petri networks. In particular, the authors define a standard XML Log for the recording of workflow instances. Starting from this log file and applying appropriate transformations the definition of the Petri network is reached, representing the final workflow model.

Still within the domain of workflow mining techniques, US-A-2004/0254768 describes a method and an application aimed at the business process reengineering through the application of data mining techniques to the execution of workflows conveniently recorded in a database. Additional background information of interest can be found in "INTEGRATING MACHINE LEARNING AND WORKFLOW MANAGEMENT TO SUPPORT ACQUISITION AND ADAPTATION OF WORKFLOW MODELS", J. Herbst and D. Karagiannis, International DEXA (Database and Expert System Application) Conference, 1998; this paper describes a method and two different algorithms for the acquisition and remodelling of workflows. The two algorithms executed sequentially (merging and splitting) have as an input a log file related to the execution of the workflows and produce as an output a workflow model (general model) that represents them. While executing this, a Hidden Markov data structure model is used.

It is known in the telecommunication field that regular expression matching techniques can be used in order to perform system log analysis and pattern matching. The same techniques can also be used for other purposes, such as for signal processing still in the telecommunications domain, or for DNA and protein sequences analysis in bio informatics.

Existing methods of pattern matching are based on the matching of so-called "regular expressions". In particular, two main categories are detected that realize respectively "regular expression matching" and "approximate regular expression matching".

In general, regular expression matching can be defined as follows: given an alphabet $\Sigma$ (a finite sequence of characters), a regular expression $P=P[1] P[2] \ldots P[m]$ of length m (the length of the regular expressions is calculated considering single characters or classes of characters), a text $T=T[1] T[2] \ldots T[n]$ of length n, where the regular expression and the text are defined in terms of the alphabet $\Sigma$, in general with $m<<n$, the matching of a regular expression consists in finding all the sub-strings S of T that are occurrences of the regular expression P.

Approximate regular expression matching is a generalization of regular expression matching, and, as it is, has a wider field of applicability. In particular, the approximate regular expression matching can be formally defined as follows: given an alphabet $\Sigma$ (a finite sequence of characters), a regular expression $P=P[1] P[2] \ldots P[m]$ of length m (the length of the regular expressions is calculated considering single characters or classes of characters), a text $T=T[1] T[2] \ldots T[n]$ of length n, where the regular expression and the text are defined in terms of the alphabet $\Sigma$, in general with $m<<n$, an integer $k \geq 0$ and a distance function d. Approximate regular expression matching consists in finding all the sub-strings S of T so that $d(S, P_i) \leq k$, where $P_i$ is an occurrence of the regular expression P.

Referring to approximate regular expression matching, two are the distance functions mainly used: the Hamming distance and the Levenshtein distance.

The Hamming distance, defined between strings of the same length, is the number of positions with different characters in the two strings. Approximate regular expression matching in which the d distance is the Hamming distance is known as the matching with k mismatch.

The Levenshtein distance, defined between two strings not necessarily having the same length, is the minimum number of insertions, deletions, and substitutions of characters required to transform a string into another. Approximate regular expression matching, in which the d distance is the Levenshtein distance, is known as the matching with k differences or errors.

In the literature there are different approaches to the problem of regular expression matching.

For instance, the article "NR-GREP: A FAST AND FLEXIBLE PATTERN MATCHING TOOL", G. Navarro, in Software Practice and Experience (SPE), 31, pages 1265-1312, 2001 describes a method, a set of algorithms and a tool for searching complex patterns. In particular, the algorithms used allow searching simple and complex patterns besides the regular expressions within the character sequences in two different modes: with errors and without errors. The errors that are treated with this tool are: deletion, insertion, substitution and transposition of characters.

The article "FAST TEXT SEARCHING ALLOWING ERRORS", S. Wu and U. Manber; Communication of ACM, 35 (10), pages 83-91, 1992 describes an algorithm for approximate strings matching within a text. In particular, the algorithm uses Shift-or with bit parallelism and in the case of regular expressions refers to the construction of the Thompson automaton.

The article "FROM REGULAR EXPRESSION TO DETERMINISTIC AUTOMATA", G. Berry and R. Sethi, Theoretical Computer Science, 48, pages 117-126, 1987 describes the Glushkov automaton and its reconstruction starting from a regular expression. A Glushkov automaton is a finite state automaton composed by a set of states, one for each character or character class in the corresponding regular expression, and a set of labelled edges. The Glushkov automaton differs from the more widely known Thompson automaton in that all the arrows arriving to a state are labelled by the same letter.

To complete the overview of the art mention can be finally made to the text of A. V. Aho, R. Sethi and J. D. Ullman, "Compilers: Principles, Techniques and Tools", Addison-Wesley, 1986, section 3.8, pages 128-134, which describes the simulation of a finite state automaton based on stack, usable for the description of the stack of Glushkov automaton states.

OBJECT AND SUMMARY OF THE INVENTION

The Applicant has tackled the problem of providing a technique of regular expression matching that can be advantageously used for the automatic reconstruction of the sequence of interventions (manual activities and commands) performed on a network equipment by a field engineer, based on the sequence of events generated on the equipment, which can be automatically recorded and stored as logs (such as XML Logs).

The Applicant has verified that the regular expression matching techniques of the prior art are unsuitable to reconstruct the sequences of interventions. The Applicant has found that the reason is the inability of such techniques of detecting errors in the sequence of events, in particular in the found matches in case of approximate matching.

The Applicant has for example observed that interventions close in time with each other can give rise to almost simultaneous sequences of events, wherein events generated by a first intervention may interlace with events generated by a second intervention. Automatic interventions reconstruction can in this case become difficult or even impossible if errors in the sequence of events are not identified and if matching is performed without taking into account these errors.

The Applicant has found a method of determining with very high accuracy the sequence of interventions performed on a network equipment that comprises associating the different possible interventions (manual activities by a field engineer or commands) with corresponding regular expressions, locating by approximate matching and with a maximum number of insertions the recurrences of the regular expressions in the list of events generated in the equipment as a result of the interventions, identifying the insertions in the recurrences, and finally removing the recurrences while leaving in the list the identified insertion.

This invention can be advantageously applied in the context of Operational Knowledge Management systems for automatic generation of workflow models from the information collected during the interventions. In particular the present invention allows defining and designing a complete solution to support the workforce that, starting from the log recording on the network equipments, generated by interventions of the workforce itself, is able to generate the workflow model and to make such model part of the entire company's know-how.

In particular, the workflow model related to an intervention on a network equipment, having associated therewith a resource proxy agent, can be generated by sending from the resource proxy agent to a recording unit used by the field engineer signals representative of commands sent to the network equipment and of events generated by interventions (commands and manual activities) performed on the network equipments, and then by analyzing the signals to produce therefrom a workflow model of the intervention. The workflow model is generated by using the above mentioned technique of approximate matching, in which the recorded sequences of events and commands are compared with predefined regular expressions of interventions.

In this manner, the operator's knowledge is not lost, but is stored in a repository and becomes, therefore, company asset. Furthermore the arrangement described herein does not require from the operators an extra commitment besides their own normal activities, since the necessary information for the creation of the workflow models is automatically collected.

The invention can be applied also in other context where approximate matching of regular expressions is required, as in the technology fields previously mentioned.

According to a first aspect thereof, the present invention thus relates to a method operating on a computer for matching by means of regular expressions a list of elements in a set of elements, wherein the regular expressions define respective groups of elements in the set, the method including the steps of:

approximately matching by means of the regular expressions the list of elements by locating recurrences of the regular expressions in the list of elements with a maximum number of matching errors, the matching errors corresponding to insertions deriving from the superposition of groups of the elements related to different regular expressions; and each time the recurrence of one of the regular expressions is located in said list, removing from the list the group of elements defined by the regular expression located, while leaving in the list those elements corresponding to errors.

Preferably, the method further includes the steps of:

generating a plurality of sets of matching errors for the regular expression whose recurrence is located in the list;

selecting one set of matching errors out of the plurality of sets of matching errors; and leaving in the list those elements corresponding to the errors included in the selected set of matching errors.

Each set of matching errors can comprise 0 or more matching errors (in case of 0 errors, no element will be left in the list).

Moreover, the method preferably includes:

producing orderly scans of the list of elements; and comparing the orderly scans of the list against the regular expressions.

In a preferred embodiment, the method also includes the steps of:

defining the regular expressions over a finite alphabet $\Sigma$; and representing the list (20) of elements as a text $T=T[1] T[2] \ldots T[n]$ in the form of a sequence of values over the alphabet $\Sigma$.

Preferably, the method includes the further steps of:

creating a set of Glushkov automata for each of the regular expression, the set of Glushkov automata including $k+1$ automata, wherein k is the maximum number of matching errors; the Glushkov automata in the set being connected to each other via transitions from a state in one automaton to the corresponding state in a neighbouring automaton;

storing the instantaneous condition of the k+1 Glushkov automata in the set in an ordered collection including the current states of the Glushkov automata, wherein each state is coupled to a list of tags indicating those of the insertions considered for reaching each state; and locating the insertions as a function of the list of tags.

The following steps may also be included:

following all the possible transitions for each element in the list, by removing from the ordered collection the starting states and adding to the ordered collection the final states of the transitions, each final state corresponding to a possible occurrence of the corresponding regular expression;

copying for each final state the list of tags of the starting state; and adding to the list for the final state, if the transition is related to one insertion, a further tag indicative of the position of the insertion.

The method preferably includes the step of selecting a stack as the ordered collection.

In the case of plural sequences of elements in the list being adapted to be approximately matched by one of the regular expressions, the method includes the step of selecting the sequence satisfying one of the following criteria:

the sequence selected minimizes the number of matching errors;

in the presence of same number of matching errors, the sequence selected provides the more extended matching.

The step of approximately matching by means of the regular expressions the list of elements preferably includes the operation of ascribing a sequence of elements in the list to a given regular expression if the regular expression corresponds to the sequence but for a given number of insertions therein.

The method may also include the step of translating the groups of elements in the list into corresponding symbols associated to respective ones of the regular expressions.

Preferably, the method includes the step of approximately matching the list of elements by means of the regular expressions by processing in parallel the regular expressions.

In particular, the method may include the step of processing in parallel the regular expressions by using a lex-like method.

The method may include the step of associating timestamps with the elements in the list.

The step of approximately matching by means of the regular expressions the list of elements may include the operation of considering as non-ascribable to a given regular expression an element in the list having no timestamp compatibility with the given regular expression.

The method may further include the steps of:

selecting the regular expressions as representative of commands;

considering, each at a time and in time sequence, the commands and performing a search of a regular expression with the maximum number of matching errors associated with the respective command considered at each time;

if a match is found, ascertaining the timestamp compatibility thereof; and if no compatibility is found, stopping the process;

if compatibility is found and the matching is approximate, identifying the matching errors corresponding to the insertions.

The timestamp compatibility may be defined on the basis of at least one of the following criteria:

a sequence of elements in the list whose element has a timestamp separated from a given regular expression beyond a given maximum delay has no timestamp compatibility with the given regular expression and is not ascribable to the given regular expression;

the difference between the timestamps of the pair comprised of the first and the last element of a sequence of elements in the list matched by a given regular expression must be lower than a maximum extension value.

The method may further include the steps of:

selecting the regular expressions as representative of commands included in at least one respective log;

if, as a result of the step of approximately matching by means of the regular expressions the list of elements, a match is found compatible with one of the commands, the match is accepted and such command is removed from the respective log;

if no valid match is found at a certain step, the process is stopped;

if the process is completed with at least one command remaining in the respective log, the process is invalidated.

The method may also include the step of generating the list of elements as a list of events occurring in at least one equipment as this equipment is subject to actions executed thereon, whereby the regular expressions matching the list are representative of the actions executed on the at least one equipment.

The regular expressions are preferably representative of manual activity or commands executed on the at least one equipment.

The present invention also relates to a method for the automatic generation of workflow models related to interventions on equipments of a telecommunication network, the method including:
- expressing a set of possible interventions as regular expressions in terms of events that would be generated on an equipment as a result of said interventions;
- performing at least an intervention of said set on an equipment;
- collecting in a list the events generated by the equipment as a result of the at least an intervention; and
- approximately matching the list of events with the regular expressions according to the method previously described.

The present invention also relates to computer-based system for automatically matching by means of regular expressions a list of elements in a set of elements, wherein the regular expressions define respective groups of elements in the set, the system being configured for performing the method described above.

The present invention finally relates to a computer program product, loadable into the memory of at least one computer and including software code portions for performing the method described above.

As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

BRIEF DESCRIPTION OF THE ANNEXED DRAWINGS

The invention will now be described, by way of example only, with reference to the enclosed figures of drawing, wherein:

FIG. 1 is a block diagram of a system architecture adapted to implement the arrangement described herein;

FIGS. 2 and 3 are two flow charts representative of the operation of the arrangement described herein;

FIGS. 7 and 8 are exemplary representations of a Glushkov automaton and semi-automaton as possibly used in the arrangement described herein.

DETAILED DESCRIPTION OF PREFERRED EMBODIMENTS OF THE INVENTION

Figure 4:
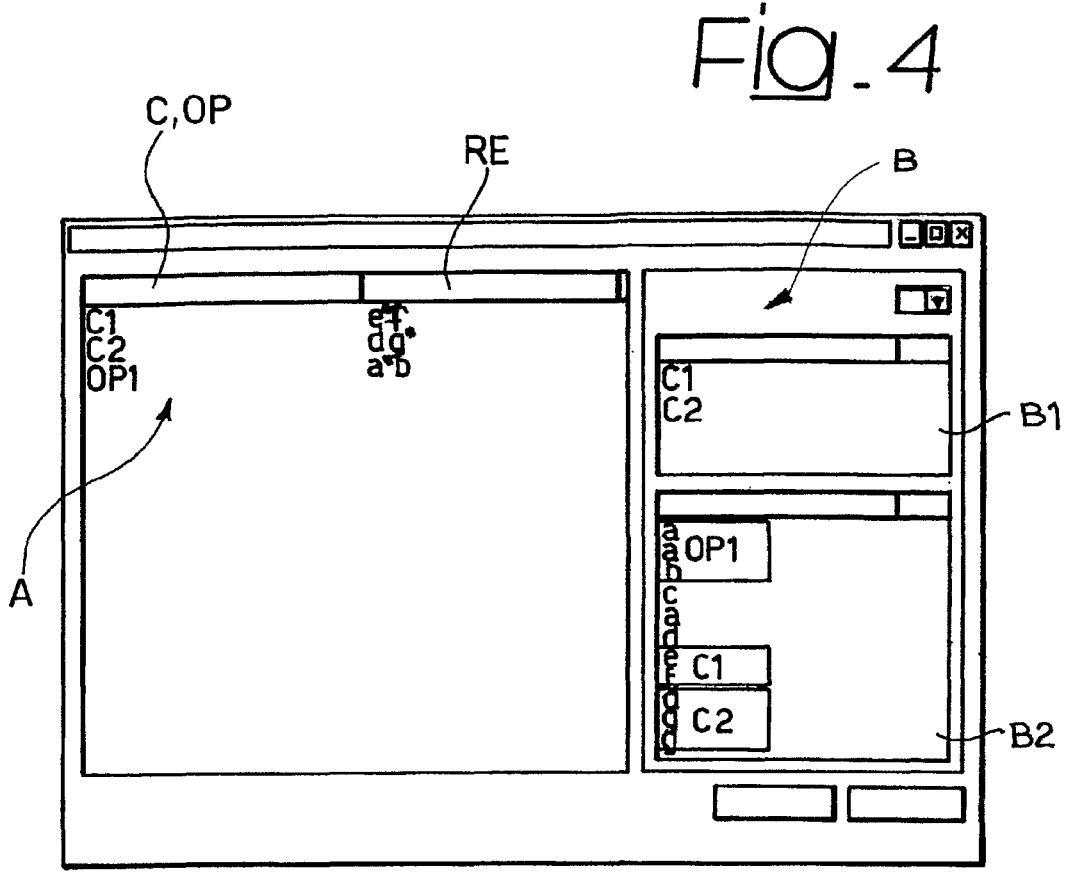
FIGS. 4 to 6 are examples of man-machine interaction via a graphical user interface (GUI) associated with the arrangement described herein.

The following description of an exemplary embodiment of the invention will primarily refer to an architecture and method for automatically generating workflow models starting from the so-called "logs" of operational events occurring in equipments included in a telecommunication network.

By way of introduction to the description that follows a number of basic definitions are provided.

Operator: an operator is a member of the company staff being part of the workforce, meant as mobile workforce (field engineers) or specialized workforce (back-office staff).

Agent: an agent is an independent process with a possible persistent identity, and that requires communication (for example in a cooperative and/or competitive manner) with other agents in order to fulfil its tasks. This communication is implemented through asynchronous message exchange and by using well-known languages (i.e. Agent Communication).

Proxy: a proxy is a software component through which it is possible to control or intervene on network equipments and that manages communication between the highest levels in the network management hierarchy and the network equipments.

Workflow or workflow model: a workflow is the complete or partial automation of a process in which information or tasks are passed from a participant to another according to a defined set of procedural rules (definition within the "Workflow Management consortium—WfMC"). In the context of the present invention each step of a workflow corresponds to a manual activity or a command that has been executed by an operator on a given network equipment. A workflow can be represented through a flowchart as a sequence of tasks and temporal and logical dependencies among tasks, including alternative and parallel branches. A workflow can also be described as a finite state machine or with standard languages such as XPDL (XML Process Description Language).

Workflow log: a workflow log consists of a sequence of information related to the various steps that constitute a workflow. A workflow log can be expressed in XML language using a format known as XML Log.

Workflow mining: Workflow mining is an Artificial Intelligence methodology aimed at extracting the information related to the execution of the workflows from the workflow logs in order to produce a workflow model that represents their execution.

FIG. 1 illustrates the basic elements of the architecture described herein, designated 10 as a whole.

These include:
- a Graphical User Interface (GUI) 12;
- a so-called Mine Manager (MM) 14; and
- a plurality of databases (DB) supporting operation of the Mine Manager 14, including a Workflow database 16, an Operational log database 18, an Events log database 20, and a Visual log database 22.

The Mine Manager 14 co-ordinates operation of a layer of Recorder Agents 24 that in turn co-operate with a layer of Resource Proxy Agents $RP_1, RP_2, RP_3, \ldots, RP_N$ associated with Network Elements $NE_1, NE_2, NE_3, \ldots, NE_N$.

The architecture illustrated in FIG. 1 is based on some functionality available from the platform for the distributed telecommunications network management and related services described in the applications WO-A-2005/18249 and PCT/EP2005/008238.

WO-A-2005/18249 discloses a system architecture for managing a telecommunication network including network equipments and supported network services, the equipments having associated control interfaces. The architecture comprises a base layer for proxying the interfaces and decoupling them from management functions, as well as a support layer comprised of a community of agents co-ordinating operation of said base layer in order to support distributed management functionalities. The base layer and the support layer constitute separated superposed layers in the architecture. The layers include components adapted to perform respective functions based on respective instruction information provided to them. A database is provided for storing the instruction information and the architecture is arranged for distributing the instruction information from the database to the components. Preferably, all the layers in the architecture include process executors.

PCT/EP2005/008238 discloses a further improvement of the basic architecture of WO-A-2005/18249 wherein instruction signals arranged in workflows are generated for performing interventions on network equipments included in a communication network having associated Resource Proxy Agents. The method of PCT/EP2005/008238 includes the steps of:

providing a distributed architecture of intervention management proxy agents for managing interventions on the network equipments, wherein the intervention management proxy agents are associated to terminal devices, and generating instruction signals for performing interventions on the network equipments via the intervention management proxy agents in an interactive manner with the Resource Proxy Agents associated with the network equipments, so that instruction signals are a function of the status of the network equipments.

In the arrangement shown in FIG. 1 herein, the Network Elements (or Equipments) $NE_1$, $NE_2$, $NE_3$, ..., $NE_N$ are those network elements on which the operators carry out their interventions. Following these interventions that modify their internal status, the network equipments generate a set of events—$E_1$, $E_2$, $E_3$, $E_N$—.

Each Resource Proxy Agent RP is associated to a single network equipment (so that the matching is a one-to-one relationship) and is responsible of the creation, maintenance and management of a so-called "image" of the corresponding network equipment. The image is a representation of the configuration of the network equipment according to a specific data model.

Each Resource Proxy Agent RP is responsible for the communication with the corresponding network equipment as well as with the Recorder Agents 24 and comprises the following elements:

a Process Communication Layer—PCL—which is a component of the Resource Proxy Agent RP dedicated to the management of the communication with the Recorder Agents level and with the level constituted by the network equipments;

a Cache Memory—CM—in which the image of the network equipment is stored together with a mapping table between the network equipment itself and the Recorder Agents 24 that are interested in registering the interventions performed by the operators on that equipment.

Each PCL, on behalf of an operator, can send commands—$C_1$, $C_2$, $C_3$, ..., $C_N$—to the network equipment managed by the Resource Proxy Agent to which it belongs. The events, triggered on the network equipment because of the commands, are conveniently recorded in the cache memory CM of the Resource Proxy Agent RP to which it belongs, together with the commands—$C_1$, $C_2$, $C_3$, ..., $C_N$.

Each PCL can send information—$I_1$, $I_2$, $I_3$, ..., $I_N$—to the appropriate Recorder Agent 24; such information are relative to the network equipment to which the Resource Proxy Agent is associated and can comprise commands sent to the network equipment and events triggered on the network equipment.

The Recorder Agent 24 is typically arranged in the device used by the operator (desktop, laptop, mobile-phone, hand-held computer). Each Recorder Agent 24 is responsible for recording the interventions that a specific operator performs on the network equipment. Further, each Recorder Agent 24 can be supported by a Web Cam to visually record the interventions that are being performed by the operator itself on the network equipment. Each Recorder Agent 24 may comprise a cache memory for storing the commands executed by the operator on the network equipment, the visual files of the manual activities executed by the operator on the network equipment and the events generated by the network equipment.

Each Recorder Agent 24 can interact with the Resource Proxy Agents associated with the different network resources by sending recording requests $RR_1$, $RR_2$, $RR_3$, ..., $RR_N$ in order to obtain the above-mentioned information containing commands sent by a Resource Proxy Agent RP to its associated network equipment and events generated by the network equipment as results of interventions performed by the operator that is associated to the Recorder Agent 24.

The Mine Manager 14 is responsible for co-ordinating the first activities recording level. Further it automatically generates XML Log files, starting from the commands and the events on the network equipment, and the workflow models, starting from the XML Logs. Finally it makes available to the expert users the GUI 12 to support (in case the automatic process fails) the reconstruction of the intervention performed by the operator in a workflow model and the definition of the manual activities and of the commands in terms of regular expressions.

The Mine Manager 14 comprises the following components (not shown):

Workflow miner: this component is responsible for the generation process of the workflow models starting from the XML logs relative to the execution of the interventions on the network equipments by the operators;

Log recorder: this component is responsible for the creation process of XML Logs starting from the recording of the events on the network equipments generated by the execution of interventions by the operators.

The Mine Manager 14 is also responsible for the management of the Workflow Log DB 16, of the Operational DB 18, of the Events Log DB 20, of the Visual log DB 22 as well as for the management of the single Recorder Agent 24.

The Workflow DB 16 is a single storing point of all the workflow models present at the start of the intervention or obtained through the automatic recording process of the operator's intervention. In other words, the Workflow DB 16 stores the Workflow generated by the Mine Manager, which collects and processes the data coming from the different Recorder Agent and, therefore, from different expert users associated with said Recorder Agents.

The Operational log DB 18 stores the data relative to the interventions (i.e., manual activities and commands) performed by the operator on the network equipments, by recording them in an appropriate XML Log format. This element supplies to the users, a single storing point (from a logical perspective).

The Events log DB 20 stores the events generated by the network equipments and the commands that operators send to these equipments. This element supplies to the users a single storing point (from a logical perspective).

The Visual log DB 22 is a single storing point of all the video records related to the execution of the interventions on the network equipments by the operators.

A main feature of the arrangement described herein lies in that the related system architecture is able to record interventions performed by operators (field engineer and back-office staff) on the network equipments included in the system (typically a communication network).

This result is achieved by implementing the procedure represented by the flow chart of FIG. 2.

Typically, a Work Request—WR—(i.e., a request addressed to the field expert), or an intervention request (i.e., a request addressed to the back-office) related to a specific equipment, and possibly specifying fault symptoms, is received by the back-office staff (if it is an intervention request) or a field engineer (if it is a WR). If a field engineer is involved, the WR, containing information such as intervention type, network equipment type, component type, and fault, is displayed on his device (laptop, mobile-phone, hand-held computer) (step 100).

The operator (field engineer or back-office staff) starts his intervention. In step 110 the Recorder Agent 24 running on his own device sends a request (automatically or by order of the operator) to the appropriate Resource Proxy Agent RP responsible of the network equipment (to which the WR or the intervention request is referred to) that specifies its will to receive the commands and events related to the network equipment. The request can be sent by using the ACL language, through a wired or wireless connection between the Recorder Agent 24 and the Resource Proxy Agent.

In the case of a field engineer, the Recorder Agent 24, if conveniently supported by a Web Cam, can activate (automatically or by order of the field engineer) the visual recording of the intervention performed by the field engineer.

The Resource Proxy Agent RP, following a request received from the Recorder Agent 24, adds a record in an appropriate table that represents the interest of a Recorder Agent 24 to get commands and events related to the network equipment associated to the Resource Proxy Agent RP. The record contains at least an identifier of the Recorder Agent 24 and the start time of the activity (time_start_activity) (step 120).

The Resource Proxy Agent RP, through its PCL, periodically collects event information from the network equipment NE associated to it and stores such information (which represents a status information of the network equipments), together with the commands sent to the network equipment, in its own cache memory CM, on which also the network equipment's image can be recorded (step 130).

The events triggered on network equipment can also be detected by the Resource Proxy Agent RP through independent reports sent by the network equipment to the Resource Proxy Agent RP itself. The events are then stored in the cache memory CM of the Resource Proxy Agent RP.

Through the Recorder Agent 24, the operator notifies to the Resource Proxy Agent RP to have completed his intervention and the Resource Proxy Agent RP can update the record of the reference Recorder Agent 24 by adding the end time of the activity (time_end_activity) (step 140). Then, the Recorder Agent 24 verifies, through the Resource Proxy Agent RP, the correct execution of the intervention (step 200).

In the case of successful execution of the intervention (exit Y from step 200) the Resource Proxy Agent RP communicates to the Recorder Agent 24 of the operator (who has finished his intervention), the events triggered on the network equipment and the possible commands executed by the operator on the network equipment through the Resource Proxy Agent RP in the time period that goes from the time_start_activity to the time_end_activity (step 210).

In any case the Resource Proxy Agent RP communicates to the Recorder Agent 24 the result of the verification of the correct execution of the intervention. In addition the Resource Proxy Agent RP deletes the record of the Recorder Agent 24 of the operator who has finished his intervention.

In turn, the Recorder Agent 24, in the case of correct execution of the intervention, sends to the Mine Manager 14 (step 220), through wired or wireless connection an using ACL language, the data relative to the events triggered on the network equipment on which the operator has performed his intervention and the possible commands executed by the operator on the network equipment itself. In addition the Recorder Agent 24, in the case wherein the visual recording of the intervention of the field engineer has been activated, sends to the Mine Manager 14 also the file containing the images relating to the execution of the intervention by the field engineer.

Whether the execution of the interventions fails or succeeds, the recording procedure stops (step 230) with the storage in the Events log DB 20 of the data relative to the events triggered on the network equipment and of the possible commands executed by the operator on the network equipment itself. Finally, the file related to the possible visual recording of the intervention of the field engineer is stored in the Visual Log DB 22.

In a possible alternative to the above process, the Resource Proxy Agents RP are responsible to send to Recorder Agents 24 newly detected events triggered from the network equipment or commands issued to the network equipment as soon as they are observed. These data are then buffered by Recorder Agents 24. In this implementation events and commands are not temporarily stored inside Resource Proxy Agents RP that have only to keep track of which Recorder Agents 24 asked to be informed of events triggered and commands executed on network equipments.

At the end of the intervention, the system performs a reconstruction of the intervention. The reconstruction of interventions, composed of manual activities and commands performed by operators on network equipments, has a log of events and a log of commands, appropriately recorded in the Events log DB 20, as input, and a workflow model, describing the type of intervention to which the sequences of manual activities and commands performed by operators and provided as input to the reconstruction process refer to, as output. In the discussion below it is assumed that interventions are composed of a sequence of manual activities and/or commands. The definition of commands and manual activities is supported by a GUI 12 available from the Mine Manager 14 described in the following.

It is further assumed that each command that can be executed by an operator through a Resource Proxy Agent, and each manual activity that triggers events, can be associated with a "regular expression". The regular expressions are defined in terms of the events that can be generated by network equipments. For a definition of the concept of "regular expression", reference may be made to the various bibliographic documents and the discussion in the introductory portion of this description.

The solutions described here make it possible to discover the workflow model corresponding to the WR type or to the intervention request type to which a set of interventions performed by operators refers.

The workflow model discovery procedure is described with reference to the flow diagram of FIG. 3.

The Log recorder part of the Mine Manager 14 queries the Events log DB 20 to acquire the sequences of events and commands relating to the intervention performed by an operator (step 500).

The sequence of events is processed by the Log recorder part of the Mine Manager 14 through an approximate regular expression matching procedure described in detail below. The approximation is taken into account since network equipments may generate (independently or because stimulated by other network equipments) spurious events or because the manual activities or commands performed on network equipment may trigger simultaneous events.

For each occurrence of a previously defined regular expression the system emits the manual activity or command Identifier (step 510).

When the procedure is completed a sequence of manual activities and commands, corresponding to the sequences of events and commands that were given as input, is produced. Furthermore, commands that do not trigger events, related to the intervention performed by an operator, that are not detected during the previous steps and are still stored in the Events log DB 20 are added to the output sequence (step 520).

The sequence of the activities performed during an intervention (i.e., manual activities and commands) is stored in the Operational log DB 18 in the XML Log format together with the associated WR or intervention request to which the intervention refers to, and the recorded data are tagged as "executed". In case of failure of the events processing step the Mine Manager 14 records in the Operational Log DB 18 only the WR or the intervention request to which the intervention refers to and the recorded data are tagged as "failed" (step 530).

The Workflow miner part of the Mine Manager 14 checks whether there is a sufficient number (the specific value can be chosen on a case by case basis or can be a predetermined, fixed value) of XML logs related to the same type of WR or of intervention request (step 540); in the case of successful check (exit Y from step 540), the Workflow miner part of the Mine Manager 14 queries the Operational log DB 18 and acquires all the XML Logs related to that type of WR or of intervention request (step 550). In case there is not a sufficient number of XML Logs (exit Y from step 540) the process jumps back to step 500, where the Log recorder part of the Mine Manager 14 queries the Events log DB 20 to acquire the sequences of events and commands to be processed. Furthermore if the discovering of the workflow model needs external supervision, expert users are provided with a GUI 12, described below, for the human-assisted discovery of the workflow model.

The sequences of manual activities and commands listed in the various XML Logs are processed by the Workflow miner part of the Mine Manager 14 through a workflow mining algorithm (chosen among the ones mentioned in literature: see the introductory portion of this description) possibly including the extension described in the following of this document. The result of execution of this algorithm is the generation of a workflow model (step 560).

The workflow model thus generated can be examined by an expert user by using the GUI 12 of the Mine Manager 14. The expert user is supposed to analyse the workflow model and at the end of this stage the workflow model can be validated and accepted. In addition, before validating the workflow model, the expert can require a further feedback on the quality of the generated workflow model to the operators that performed the interventions based on which the workflow model was produced (step 570).

At the end of the described procedure the workflow model is stored in the Workflow DB 16 and is matched with the WR/intervention request to which the intervention or the set of interventions refers. Finally all the XML Logs related to the generated workflow model are deleted from the Operational log DB 18 (step 580).

The following is a description of a method for determining a sequence of manual activities and commands from the log of a network equipment.

It will be assumed that at least some manual activities or commands that can be executed on a network equipment trigger events. The log of a given network equipment contains a sequence of events and/or commands in a format that is specific for that network equipment. The log is assumed to be complete (all the events triggered by commands or manual activities and all the commands executed on the network equipment are available in the log). The sequence of commands is sorted by time. It is assumed that a mapping between the format with which the events and the commands are reported and stored in a given network equipment (the log) and the values (for example characters) used in the method described below is defined.

An event will herein after indicated with small letters of the Latin alphabet (a, b, c, . . . ), for example:

A port with traffic has been extracted_on ➔ a

Optical Service channel lost_on ➔ b

. . . ➔ c

The data input to the automatic derivation process is expected to be pre-processed on the basis of the above-mentioned mapping.

A similar mapping is defined for commands, but the set of values used to map commands is different from the one used to map events. Herein after commands will be represented with the capital letter C followed by a number, for example:

Change IP Address ➔ C1

Save Configuration ➔ C2

Each command and event in the above sequences is marked with a timestamp (in arbitrary units). For example a sequence of events could be of the form (the timestamp is in subscript):

$a_1 \ b_3 \ a_4 \ a_7 \ c_9 \ b_{13} \ d_{14} \ f_{23} \ g_{26}$

The values used to represent activities performed during an intervention (i.e., manual activities and commands) are here referred to as "symbols". The symbols used to identify commands are the same used in the logs, i.e. the values C1, C2, . . . , while manual activities will be represented with the symbols OP1, OP2, . . . . Therefore, in the following, the term symbol will identify either a manual activity (OP) or a command (C). Each symbol that identifies a manual activity or command that can trigger events is associated with a regular expression.

The regular expression must be written in such a way that it can successfully match all the possible sequences of events that the execution of the corresponding command or manual activity can trigger, for example:

C1: ab*

OP1: a(c|d)ff

OP2: fdc?

where "*" indicates a possible repetition of zero or more occurrences of the preceding block, "|" indicates the possibility of having either the block preceding it or the one following it, and "?" indicates that the preceding block is optional.

Sequences of events that are triggered by the execution of a given command or manual activity are composed of events that are temporally "close" to each other.

The derivation method described here expects that some constrains are satisfied. In particular, it is assumed that the events triggered by a command executed on a network equipment have a timestamp subsequent to the one of the corresponding command as it is recorded in the commands log. This means that, for example, the sequence $a_3b_5b_6b_7$ is not ascribable to the observed command $C1_4$.

Moreover, it is further assumed that a sequence of events is ascribable to a given symbol if the regular expression of that symbol matches the sequence with less than k insertions. The k value is defined a-priori for each network equipment, for example, for k=1, $a_5b_6c_6b_7b_8$ can be tracked back to the observed command $C1_4$ ($c_6$ being the insertion).

The sequences in which the first event has a timestamp that is "distant" from the one in a given command for more than a predetermined time, herein called max_delay, cannot be ascribable to that command. Therefore $a_{51}b_{52}b_{54}b_{56}$ cannot be tracked back to $C1_4$ if max_delay is set to 10.

Finally the "distance" between the timestamp of the first event of an occurrence of a given regular expression and the timestamp of the last event of the same occurrence must be less than a predetermined value, called max_extension, that must be set in advance. Therefore, if max_extension=5, $a_5c_6f_7f_{18}$ cannot be detected as an occurrence of OP1. In the case that, at each step of the derivation process, multiple sequences in the stream of the events are recognized, the following criteria for resolve ambiguity are used:
  matchings with less insertions are preferred;
  in case of matchings having the same number of insertions the most extended one is preferred.

Moreover, the automatic derivation process is based on the following assumptions:
  1. The input data can be:
  a sequence (or stream) of events and a sequence of commands;
  a sequence (or stream) of events; or
  a sequence of commands.
  2. As an optional way, viable only if the sequence of commands is available, the sequences of events that are ascribable to the various logged commands are searched in the events log. This step is carried out as follows:
    commands, associated to the regular expressions, that appear in the sequence of commands are considered one at the time and in time order;
    a search of the regular expression associated to the examined command is made. The search is based on one of the approximate regular expressions matching algorithms known in literature and is carried out allowing at most k insertions;
    if a match is found, the timestamps are checked for compatibility;
    if no matches are accepted, the whole process is stopped, otherwise up to k insertions (unless the matching is exact) are located and it is decided how to handle them using the procedure described later. The characters/values that are used in the matching are removed from the sequence of events. The command is removed from the commands log as well.
  3. The match of sequences of events with the corresponding symbols is carried out starting from the beginning of the stream of events (after the processing of this executed in the previous step, if any) to the end.

The match is done by considering up to k different insertions, using a lex-like tool allowing for non-exact matches.

In the case of an implementation that does not perform step 2, if a compatible match is reached with respect to one of the commands that triggers events that is present in the sequence of commands, the match is accepted and the command is removed from the sequence of commands.

If at a certain step a valid match is not detected, the entire process is stopped. If the process is correctly completed but one or more commands that trigger events are not removed from the sequence of commands, the entire process is stopped.

For example, let command C1 and manual activities OP1, OP2, OP3, be defined in terms of the following regular expressions:
  C1: ab*
  OP1: a(c|d)ff
  OP2: fdc?
  OP3: cb*
and let consider as input the following two sequences:
  Events: $f_1$ $a_3$ $b_4$ $b_5$ $b_6$ $f_7$ $d_{10}$ $a_{12}$ $c_{14}$ $f_{14}$ $f_{15}$ $c_{21}$ $b_{22}$ $b_{23}$
  Commands: $C1_2 C2_{17} C3_{26}$ Match of events and commands with activities performed during an intervention (commands and manual activities) is achieved as follow:
  $f_1$—ERROR
  $a_3$ $b_4$ $b_5 b_6$—$C1_2$
  $f_7$ $d_{10}$—$OP2_6$
  $a_{12}$ $C_{14}$ $f_{14}$ $f_{15}$—$OP1_{12}$
  $c_{21}$ $b_{22}$ $b_{23}$—$OP3_{21}$ For each match a procedure is invoked to establish if and how to re-input in the sequence of events the detected insertions (errors).

The procedure gets as input the exact occurrence and the possible insertions (or all the insertion combinations for which the read occurrence can be ascribed to an occurrence of the matched regular expression with less than k+1 insertions).

The detection of the insertions is performed as follows:
  the Glushkov automaton is created (according to the criteria better described below) for the matched regular expression (an example is shown in FIG. 7 and will be described in the following; in such diagram letters indicate events and numbers indicate states);
  k+1 automata, identical to the one described in the previous step, are considered, connected between them through vertical transitions on any event from a state to the corresponding one of the next automaton (an example is shown in FIG. 8 and will be described in the following);
  the configuration of the k+1 automata at any given time is stored in a stack containing the active states at that time. A list of tags is associated to every state: such list marks the insertions that were to be considered in order to reach that state;
  for each event all possible transitions are followed, removing from the stack the starting states and adding the destination ones. For every destination state the list of tags for the starting state is copied. If the transition is associated to an insertion (a vertical transition), a further tag is added to the list of tags appended to the destination state thus marking the insertion position.

At the end of the described process, the types of symbols emitted are at most three:
  i) commands originally present in the sequence of commands and not associated to regular expressions;
  ii) commands originally present in the sequence of commands, associated to regular expressions, whose corresponding events have been detected in the stream of events;

iii) manual activities derived from the analysis of the stream of events.

Manual activities and commands are sorted by time. Referring to the example previously described, the sorted output is:

$C1_2 OP2_6 OP1_{12} C2_{17} OP3_{21} C3_{26}$

If a sequence of commands that do not trigger events is provided as unique input, none of the listed steps is executed and the same sequence is produced as output.

The following table shows an example of a possible definition in terms of regular expressions of manual activities that can be performed on a given network equipment.

| Manual activity/command | Manual activity/command ID | Possible sequence of events | Regular expression |
|---|---|---|---|
| Board insertion | $OP_1$ | abcdccd | ab?(c\|d) * |
| Cable insertion | $OP_2$ | ef | ef* |
| Cable removal | $OP_3$ | fd | f*d |
| Board definition | $C_1$ | ghh | gh* |
| Port removal | $OP_4$ | eehi | e*hi? |
| Port insertion | $OP_5$ | cjdede | cj?(de) * |
| Cable removal main board | $OP_6$ | k | k |
| Cable insertion main board | $OP_7$ | l | l |
| Board removal | $OP_8$ | hhhgmee | h*gm?e* |

The commands and the manual activities can be defined in terms of regular expressions (whose alphabet is the set of events) by using the GUI 12 of the Mine Manager 14, as described in the following.

Taken for example the sequence of events dddhahhgmeeedcdccdefee triggered on a network equipment as a result of the operations performed by a field engineer for removing a board, the following manual activities are detected, based on the approximate regular expression matching algorithm previously described, allowing up to 2 insertions:

| Sequence of events | d | d | d | hahhgmeee |
|---|---|---|---|---|
| Recognized manual activities | Cable removal | Cable removal | Cable removal | Board removal |
| Sequence of events | dcdccd | ef | e | e |
| Recognized manual activities | Board insertion | Cable insertion | Cable insertion | Cable insertion |

A possible mapping between the format with which the events are stored in the network equipment and the values (characters in this case) used in the automatic derivation process is reported below.

| Events Legend | |
|---|---|
| BoardIn | a |
| A board with traffic has been extracted_off | b |
| PortInsertion | c |
| Loss of signal_on | d |
| Loss of signal_off | e |
| Protection switched | f |
| BoardOut | g |
| A SPF missing | h |
| A port with traffic has been extracted_on | i |
| A port with traffic has been extracted_off | j |
| Optical Service channel lost_on | k |
| Optical Service channel lost_off | l |
| A board with traffic has been extracted_on | m |

In the following it is presented a more detailed description of the method to locate the position of insertion errors in a sub-sequence S of a given text T such that $d(S, P_i) \leq k$, for one or more occurrences $P_i$ of the regular expression P.

As a first step, the automaton of Glushkov is created for a given regular expression P, as schematically shown in the example in FIG. 7. To this respect, the above cited article "FROM REGULAR EXPRESSION TO DETERMINISTIC AUTOMATA", Theoretical Computer Science, 48, pages 117-126, 1987, describes the Glushkov automaton and its construction from a regular expression.

Let m be the number of states of the Glushkov automaton (which is also the number of characters and classes of characters present in the regular expression P). Each state (numeri) describes a character or character class in the corresponding regular expression and is marked with the position of the corresponding character or character class in the regular expression itself.

The Glushkov automaton is characterized in that all the arrows arriving to a state are labelled by the same letter (which represents the character or character class associated to the state). A Labelled edge can be followed only if the input character matches the label. Unlabelled edges can be followed on any characters given as input to the automaton.

FIG. 7 is a representation of the Glushkov automaton corresponding to the regular expression ab(c\|d)e*.

An automaton composed of k+1 (where k is the maximum number of insertion errors allowed) automata of the type described above is built by connecting each state in one automaton to the corresponding state in the next automaton over vertical transitions on any character: see FIG. 8 for an example of a Glushkov meta-automaton. The automaton depicted in FIG. 8 accepts occurrences of the regular expression ab(c\|d)e* allowing up to one insertion.

The configuration of the meta-automaton (that is the set of the k+1 automata) at a given time is stored in a stack containing all the states in which the meta-automaton can be at the same time. A list of tags is associated to every state: such list keeps track of which insertions it was necessary to take into account to reach that state.

For each character of sub-sequence S all possible outgoing edges are followed, removing from the stack the starting states and adding the destination ones. For each destination state reached the list of tags of the starting state is copied. If the transition is associated to an insertion, i.e. a vertical transition, a further tag indicating the insertion position is added to the destination state.

When the scan is completed, the stack will contain one or more final states, each representing a possible occurrence $P_i$ of the regular expression P with the list of possible insertions related to $P_i$.

As an example, consider again the automaton of FIG. 7, consisting of the string "abdce", and let k=1. The meta-automaton of FIG. 8 is therefore generated. The scanning process begins by reading the first character "a" of the string "abdce" and following the possible transitions from the starting state "0" of the meta-automaton. The meta-automaton may reach two possible destination states: state "1" in the upper automata by following the horizontal transition or state "0" in the lower automata by following the vertical transition (i.e. transition associated to an insertion). A tag I1 indicating the insertion position is added to the possible destination state "0".

Then, the scanning process goes on by reading the character "b" of the string, starting from the previously activated states "0" and "1". However, no transition can be followed from state "0" of the lower automata, so that the active state "0" of the lower automata makes the meta-automaton run out of active states. As a result the tag I1 associated to "0" of the lower automata is removed from the list of tags. The active state "1" in the upper automata makes the meta-automaton reach the destination state "2" in the upper automata by following the horizontal transition (no insertion), and the destination state "1" of the lower automata by following the vertical transition (insertion). A further tag I2, indicating the insertion position, is therefore added to the destination state "1" in the lower automata.

Character "d" is then read from the string. From state "1" of the lower automata no corresponding transition is possible and the tag I2 associated to "1" of the lower automata can therefore be removed from the list of tags. State "2" of the upper automata allows reaching state "4" of the upper automata following a horizontal transition (no insertion) and state "2" of the lower automata by a vertical transition (insertion). A tag I3, indicating the insertion position, is therefore added to the destination state "2" in the lower automata.

Character "c" is then read from the string. From state "2" of the lower automata it is possible to reach state "3" of the lower automata (i.e., with no insertion), so that tag I3 is maintained. From state "4" of the upper automata no horizontal transition is possible, while state "4" of the lower state can be reached through vertical transition (insertion). A tag I4, indicating the insertion position, is therefore added to the destination state "4" in the lower automata.

Finally, character "e" is read from the string. From state "3" of the lower automata it is possible to reach state "5" of the lower automata, and tag I3 is kept in this case. From state "4" in the lower automata it is possible to reach state "5" either, and tag I4 is kept in this case.

The scanning process is summarized in the following table.

| Read Character | Active States of the meta-automaton | List of tags |
|---|---|---|
| | 0 | |
| a | 0 | I1 |
| | 1 | |
| b | 2 | |
| | 1 | I2 |
| c | 4 | |
| | 2 | I3 |
| d | 3 | I3 |
| | 4 | I4 |
| e | 5 | I3 |
| | 5 | I4 |

The active states of the meta-automaton (two in the present example) are disposed in a stack.

At the end of the insertion detection process two possible strings are produced as output: abce (d is marked as insertion), abde (c is marked as insertion).

By way of further example, one may consider the following specifications:

a(b|c)*dd* → tokena
(ff)|(de) → tokenb where a(b|c)*dd* is a regular expression corresponding to "tokena" while (ff|de) is a regular expression corresponding to "tokenb", and where "tokena" and "tokenb" are manual activities (manual operations or commands) that trigger events and letters "a" to "f" identify events.

This means that "tokena" represents sequences starting with 'a' followed by an arbitrary number of 'b' and 'c' and ending with a sequence of one or more 'd'.

The following sequences are thus accepted as occurrences of the regular expression a(b|c)*dd*:
abd
acd
acbcccd
abcbcbbbcd
abcbbddd Similarly, "tokenb" represents only the two sequences:
ff
de Manual activities identified as "tokena" and "tokenb" may correspond for example to the following manual activities executed on network equipments:

"tokena" may correspond to the manual activity "BoardRemoved" associated with the following expression of events:

<Loss of signal_on>(<BoardOut>|<A board with traffic has been extracted_on>)*<A SPF missing> <A SPF missing>*;

"tokenb" may correspond to the manual activity "PortRemoved" associated with the following expression of events:

(<Protection switched> <Protection switched>)|(<A SPF missing> <Optical Service channel lost_off>)

Suppose now the following log of events is given as input:

| a,1 | f,2 | f,4 | c,5 | b,6 | b,7 | d,8 | d,9 |
|---|---|---|---|---|---|---|---|
| e,10 | a,11 | d,12 | | | | | | where the first element in each pair is a value on the same alphabet used for writing the regular expressions and the second element is the timestamp (that is a temporal indication) related to that value. Then the sequence above means that the value "a" was observed at time 1, the first 'f' was observed at time 2, the second 'f' at time 4 and so on.

This log of events may for example correspond to the following sequence of events:
Loss of signal_on, 1
Protection switched, 2
Protection switched, 4
A board with traffic has been extracted_on, 5
BoardOut, 6
BoardOut, 7
A SPF missing, 8
A SPF missing, 9
Optical Service channel lost_off, 10
Loss of signal_on, 11
A SPF missing, 12

The input log, composed by the above sequence of events (in this case, no command log is present), has to be translated into a sequence of manual activities or commands. This step can be done by employing a method of approximate recognition of regular expressions. It will be shown that:

if the log is parsed using regular expressions, allowing only exact matching and without time constraints, no output is given;

if the log is parsed using regular expressions, allowing approximate matching but without time constraints the following output is generated: PortRemoved, BoardRemoved, BoardRemoved;

if the log is parsed using regular expressions, allowing approximate matching and with time constraints the following output is generated: PortRemoved, BoardRemoved, PortRemoved, BoardRemoved.

The three cases are herein below described.

Suppose to analyse the input log by using regular expressions and a non-approximate matching mechanism, but without time constraint (i.e. by ignoring the timestamps); this recognition can be made with an existing tool such as lex. In that case recognition fails and produces no output. The following steps may be executed:

'a' is read;

'f' is read. The sequence "af" is not prefix (i.e., does not appear at the beginning) of any of the occurrences that can be matched by the regular expressions written above. The process is immediately stopped.

Suppose now to analyse the log given as input by using regular expressions and the approximate matching described above, by setting k (the maximum number of insertions to be considered) to 1, without however considering any time constraints (that is the max_extension constant is not used). In that case recognition produces the following output:

| tokenb | tokena | tokena |
|--------|--------|--------|

The following steps are executed:

Letters 'aff' are read and are approximate matched as an occurrence of the regular expression corresponding to tokenb with 'a' as an insertion.

Letters 'acbbdd' are read (the 'a' at the beginning was marked as an insertion during the previous step by the insertion detecting algorithm and, as a result of this, is put back in the input sequence) and are accepted as an occurrence of tokena.

Letters 'ead' are read and are matched as an occurrence of tokena with 'e' as an insertion.

Finally, suppose to use the method for approximate matching of regular expressions with time constraint, by setting k (i.e the number of insertions to be admitted) to 1 and by setting the time constraint max_extension to 7. The recognition produces the following output:

| tokenb | tokena | tokenb | tokena |
|--------|--------|--------|--------|

The following steps are executed:

Letters 'aff' are read and are matched as an occurrence of tokenb with 'a' as an insertion.

Letters 'acbbd' are read and are matched as an occurrence of tokena. The second occurrence of letter 'd' (the one with timestamp 9) is not part of the occurrence matched as tokena because the distance from the timestamp of the first event of the occurrence (which is 'a'), i.e. 1, and its own timestamp is 9−1=8, which is greater than 7;

Letters 'de' are read and are matched as an occurrence of tokenb.

Letters 'ad' are read and are matched as an occurrence of tokena.

The three cases described above show the significance of: using approximate regular expression matching; identifying (i.e. detecting) and re-inserting insertions; taking into account time constraints.

The Mine Manager 14 is designed to provide full graphical support to the definition of commands and manual activities. This component is implemented as a GUI 12 through which it is possible to define the commands and the manual activities in terms of regular expressions whose alphabet is the set of events.

GUI 12 is consistently designed according to usability principles, in order to allow expert users to accomplish their tasks with maximum effectiveness, efficiency and satisfaction.

After authentication and selection of the type of network equipment for which definitions need to be written, GUI 12 shows up to the expert users.

The layout of GUI 12 is depicted in FIG. 4 and includes the following items:

a window A where experts can define new commands and manual activities that can be performed on the network equipment during the interventions performed by operators. This task may require that one or more regular expressions RE (e*f, dg*, a*b, . . . ) be specified in connection with commands C and manual activities OP;

a window B where sequences of commands (sub-window B1) and/or events (sub-window B2) gathered from the field are shown (if available). The sub-sequences of events in sub-window B2 are matched with the commands and manual activities mentioned in window A using the regular expression matching techniques mentioned above. This match is done by taking into account how the regular expressions match sequences, i.e. approximate or exact. Groups of events referring to the same command or manual activity are highlighted using the same colour.

In order to provide a sequence of steps that an operator is supposed to carry out to fulfil a WR or an intervention request most effectively, it is needed to take specific actions to give special treatment to those commands and manual activities that do not trigger any events and therefore cannot be recovered just by taking into account the sequence of events stored in the logs of a network equipment.

The treatment of commands and manual activities that do not trigger any events is performed by providing an automatic mechanism that transforms blocks of the input workflow model, produced as output by the above mentioned workflow mining algorithm, on the basis of manually defined rules. In practice, sub-flows related to commands and manual activities that do not trigger events are inserted into flows generated for commands and manual activities that trigger events, on the basis of rules that correlate commands and manual activities that do not trigger events to commands and manual activities that trigger events. A rule is a pair (X, Y) where X is a manual activity or command that triggers events on the network equipment, and Y is an arbitrarily complex workflow sub-model (which could also be constituted by only one manual activity/command). In the workflow sub-model the initial manual activities or commands are marked and uniquely distinguished by the final ones.

The automatic mechanism replaces occurrences of X present in the workflow model with the sub-model Y according to the following procedure:

the workflow model is traversed from the initial manual activity or command to the final one;

whenever a manual activity or command appears as the left side of one of the previously defined rules, the substitution described by the rule is applied, replacing X with Y. In particular all the input transitions to X become input transitions to the initial manual activities and commands of Y and all the output transitions from X become output transitions from each of the manual activities and commands of Y.

The graphical user interface 12 facilitates the knowledge formalization and modelling process (i.e. the definition of the aforementioned rules).

Figure 5:
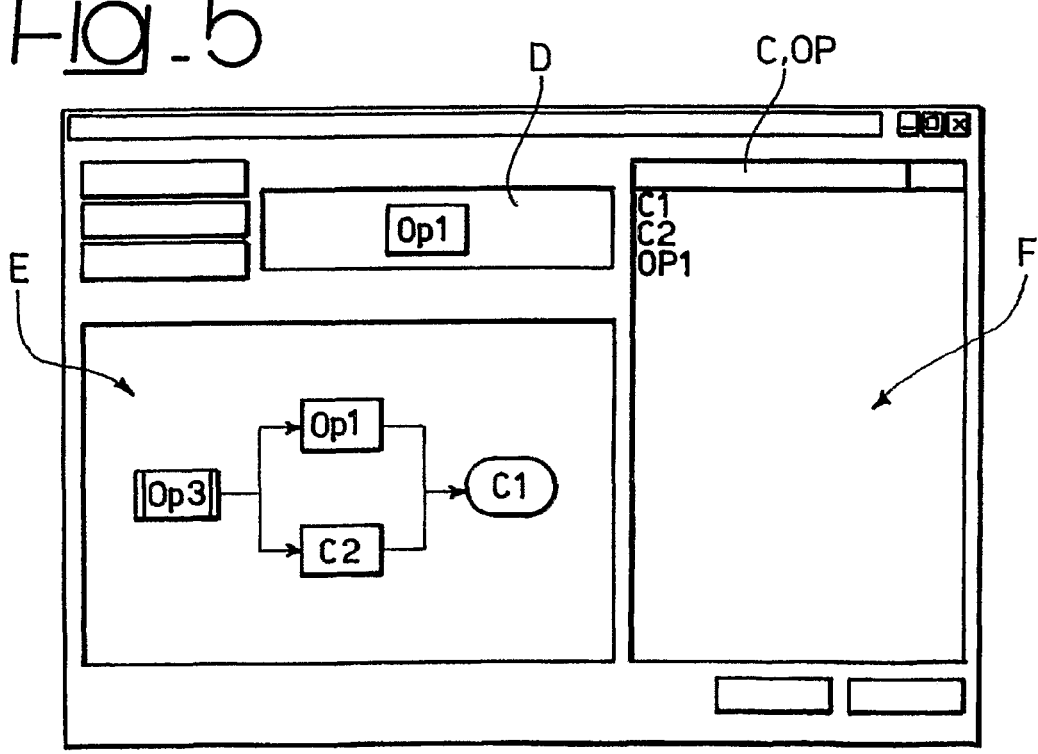

By referring first to FIG. 5, the GUI 12 can include:

a window D related to the previously defined manual activities (for instance, OP1) and commands that trigger events. Expert users can scroll the list of manual activities and commands. For each item in this list at most one sub-model can be defined using the window E discussed below. The sub-model will then be used as replacement for the manual activities or commands in the substitution procedure that was previously detailed;

a window E related to workflow sub-models that are used in the aforementioned substitution procedure. The manual activities and commands that appear in the sub-model workflow can be marked as initial or final by using the appropriate controls of GUI 12;

a window F that lists the set of commands C (for e.g. C1, C2) and manual activities OP (for e.g. OP1) available for defining the sub-model workflow.

The GUI 12 may also be configured to allow expert users to display, modify and validate workflow models previously generated and related to a certain type of intervention.

Figure 6:
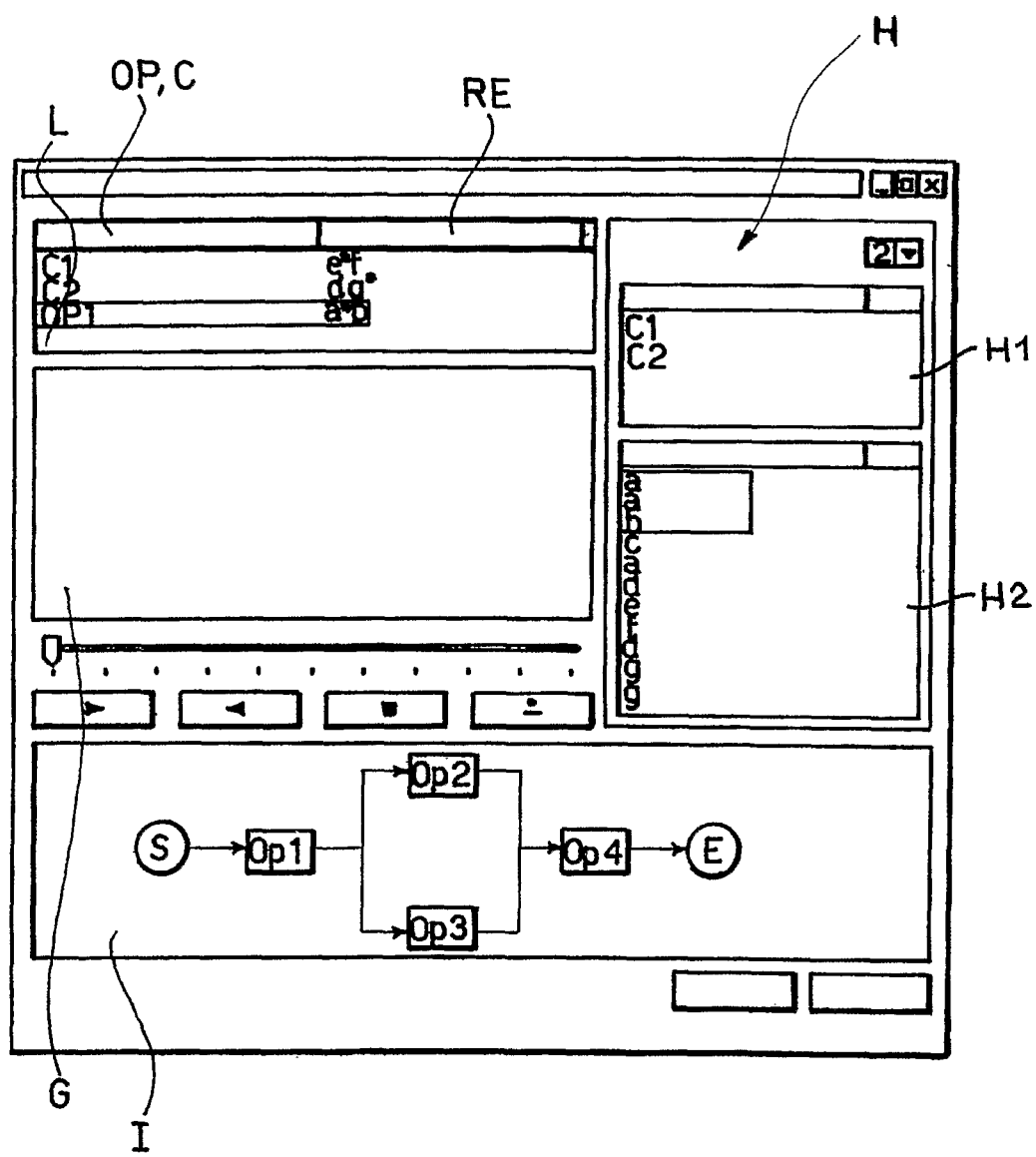

In particular, GUI 12 may show to expert users the layout depicted in FIG. 6:

a window G related to the videos that were recorded throughout a specific intervention; it should be noticed that for each type of intervention more than one video could be available (each video is about a specific intervention);

a window H displaying the commands observed (sub-window H1) and the events generated (sub-window H2) throughout the execution of a given intervention. Expert users can select a particular intervention execution. GUI 12 will display the sequence of commands and events related to it and the associated video. The selection of an element in one of the two sequences (commands or events) causes the video to be synchronized with the selected element;

a window I related to the workflow model previously generated. Expert users can select a specific manual activity or command in the displayed model. GUI 12, for each selected manual activity or command, highlights, in the events sub-window H2, the possible sequence of events, associated with the activity/command, and in the G window, previously described, the video of the manual activity or command. Expert users s can modify and accept workflow models; they can also add new manual activities or commands to the workflow model by choosing among the known ones (presented in the L window described below) or by creating new commands or manual activities. Finally branch conditions can be defined for the edges in the workflow model;

an L window of known manual activities (for e.g. OP1) and commands (for e.g. C1, C2), namely those for which corresponding regular expressions (RE) have been defined by the GUI 12.

The GUI 12 highlights, for each selected manual activity and command, the associated sequence of events in the events sub-window H2 and the related manual activity and command in the workflow model.

The method described can find applications in the field of Operational Knowledge Management where it can be used for automatically acquiring knowledge as above described.

The application field of the method of the present invention is nonetheless not limited to Knowledge Management.

The method can be applied in all fields where human operators are expected to interact manually or by commands with equipments that are able to output and record in a log file the events correlated to the activities performed by those human operators.

For example, one of these field can be the field of Intrusion Detection systems, in particular the context of Misuse Detection where attacks are supposed to be well known command sequences, called scenarios or signature attacks, and the system activity (in the form of log, network traffic, etc. . . . ) can be tracked in order to detect the presence of such scenarios in the system. In particular, the method of the present invention can find application even if the system is under multiple attacks, made by different sequences of commands overlapping each other and for which there is no easy way to separate the sequences.

In the above-defined fields, the method described above can be applied as a supplement to a tool for the approximate matching of regular expressions, according to the following procedures:

given an input file with a sequence of events, the matching tool translates said sequence of events in the corresponding commands/manual activities, described in terms of regular expressions;

for each match the method described in the present invention is invoked in order to determine if and how to re-insert in the sequence of events the possible insertions detected in the last matching.

Symmetrically, for what concerns the generation of the workflow model within the more general context of the arrangement described in connection with FIGS. 1 to 6, workflow mining procedures such as those disclosed e.g. in "WORKFLOW MINING: A SURVEY OF ISSUES AND APPROACHES", Data and Knowledge Engineering, 47 (2), pages 237-267, 2003 or US-A-2004/0254768 (both already cited in the introductory portion of this description) can be used as an alternative to the procedure specifically described herein.

Therefore, without prejudice to the underlying principles of the invention, the details and the embodiments may vary, even appreciably, with reference to what has been described by way of example only, without departing from the scope of the invention as defined by the annexed claims.

For example, the Resource Proxy Agents RP can store events and commands and then send them directly to the Mine Manager 14, where they are stored and then analysed. The transfer of the information to the Mine Manager 14 can occur after the Recorder Agents 24 has checked the correct execution of the intervention and communicated the end of the intervention to the Resource Proxy Agent RP.

As a further alternative, the Resource Proxy Agents RP may communicate directly events and commands to the Mine Manager 14 as soon as they receive them from the corresponding apparatuses, without storing them. The Resource Proxy Agents RP must in this case know the connection between Recorder Agents 24 and Mine Manager 14 in order to correctly send the data. At the end of the intervention, the field engineer communicates to the Resource Proxy Agent RP that the intervention is over and the Resource Proxy Agent RP checks the correct execution of the intervention and informs the Recorder Agent 24 and the Mine Manager 14 accordingly.

In these possible alternatives, therefore, the Recorder Agents 24 are not designed to record commands and events and these are sent directly from the Resource Proxy Agents RP to the Mine Manager 14, which then acts both as a data recording unit and a data processing unit. Even in case the Recorder Agents 24 do not record commands and events, they are still requested to send possible video records of the interventions to the Mine Manager 14 (however, in case of failure of the intervention, the video records can be deleted without being transmitted).

The invention claimed is:

1. A method of automatically reconstructing a sequence of interventions by human operators on equipment, comprising:
   recording in a log file events generated in the equipment as a result of the interventions performed by the operator, the events being recorded as sequences of elements in a list with each element having a timestamp, some of the events being superposed over each other in time;
   defining regular expressions representative of potential interventions on said equipment;
   approximate regular expression matching a sequence of elements in timestamp order in said list by locating an occurrence of one of said regular expressions in said list of elements with no more than a maximum number of matching errors and with the timestamps of said sequence of elements being within a predetermined value, each of said matching errors corresponding to an insertion within the sequence for one or more elements of the located regular expression and being associated with a regular expression different from the located regular expression;
   ascribing a group of elements in said sequence to the located regular expression if said located regular expression corresponds to said group but for the matching errors therein;
   removing from the list the group of elements defined by the regular expression located;
   leaving in said list those elements corresponding to said matching errors; and
   repeating said approximate regular expression matching, said ascribing, said removing, and said leaving in for a next sequence of elements in said list of elements.

2. The method of claim 1, comprising the steps of:
   generating a plurality of sets of matching errors for said regular expression whose occurrence is located in said list;
   selecting one set of matching errors out of said plurality of sets of matching errors; and
   leaving in said list those elements corresponding to the errors in said selected set of matching errors.

3. The method of claim 1, comprising the steps of:
   producing orderly scans of said list of elements; and
   comparing said orderly scans of said list against said regular expressions.

4. The method of claim 1, comprising the steps of:
   defining said regular expressions over a finite alphabet; and
   representing said list of elements as a text in the form of a sequence of values over said alphabet.

5. The method of claim 1, comprising the steps of:
   creating a set of Glushkov automata for each said regular expression, said set including k+1 automata, wherein k is said maximum number of matching errors; the Glushkov automata in said set being connected to each other via transitions from a state in one automaton to a corresponding state in a neighboring automaton;
   storing an instantaneous condition of said k+1 Glushkov automata in said set in an ordered collection comprising current states of said Glushkov automata, wherein each state is coupled to a list of tags indicating those of said insertions considered for reaching said each state; and
   locating said insertions as a function of said list of tags.

6. The method of claim 5, comprising the steps of:
   following all possible transitions for each element in said list, by removing from said ordered collection, starting states and adding to said ordered collection final states of said transitions, each said final state corresponding to a possible occurrence of the corresponding regular expression;
   copying for each said final state the list of tags of the starting state; and
   adding to the list for the final state, if the transition is related to one said insertion, a further tag indicative of the position of the insertion.

7. The method of claim 5, comprising the step of selecting a stack as said ordered collection.

8. The method of claim 1, comprising, in the case of plural sequences of elements in said list being adapted to be approximate regular expression matched by one of said regular expressions, the step of selecting a sequence satisfying one of the following criteria:
   the sequence selected minimizes the number of matching errors; and
   in the presence of a same number of matching errors, the sequence selected provides more extended matching.

9. The method of claim 1, comprising the step of translating said groups of elements in said list into corresponding symbols associated with respective groups of elements of said regular expressions.

10. The method of claim 1, comprising the step of approximate regular expression matching a sequence of elements in said list of elements by processing in parallel said regular expressions.

11. The method of claim 10, comprising the step of processing in parallel said regular expressions by using a lex-like method.

12. The method of claim 1, wherein said step of approximate regular expression matching a sequence of elements in said list of elements comprises the operation of considering as non-ascribable to a given regular expression an element in said list having no timestamp compatibility with said given regular expression.

13. The method of claim 12, comprising the step of defining said timestamp compatibility on a basis of at least one of the following criteria:
   a sequence of elements in said list wherein an element has a timestamp separated from a given regular expression beyond a given maximum delay, has no timestamp compatibility with said given regular expression and is not ascribable to said given regular expression; and
   the difference between the timestamps of a pair comprised of a first and a last element of a sequence of elements in said list matched by a given regular expression must be lower than a maximum extension value.

14. The method of claim 1, wherein said regular expressions are representative of manual activity or commands executed on said at least one equipment.

15. The method of claim 14, comprising the steps of:
selecting said regular expressions as representative of commands;
considering, each regular expression at a time and in time sequence, said commands and performing a search of a regular expression with said maximum number of matching errors associated with the respective command considered at each time;
if a match is found, ascertaining a timestamp compatibility thereof; and
if no compatibility is found, stopping the process; and
if compatibility is found and the matching is approximate, identifying said matching errors corresponding to said insertions.

16. The method of claim 15, comprising the steps of:
selecting said regular expressions as representative of commands in at least one respective log;
if, as a result of said step of approximately matching by means of said regular expressions, said list of elements, a match is found compatible with one of the commands, the match is accepted and said one of the commands is removed from said respective log;
if no valid match is found at a certain step, the process is stopped; and
if the process is completed with at least one command remaining in said respective log, the process is invalidated.

17. A method for the automatic generation of workflow models related to interventions on equipment of a telecommunication network, comprising:
expressing a set of possible interventions as regular expressions in terms of events that would be generated on equipment as a result of said interventions;
performing at least an intervention on said equipment;
collecting in a list the events generated by said equipment as a result of said at least an intervention, the list comprising sequences of elements with each element having a timestamp, some of the events being superposed over each other in time;
approximate regular expression matching a sequence of elements in timestamp order in said list of elements by locating an occurrence of one of said regular expressions in said list of elements with no more than said maximum number of matching errors and with the timestamps of said sequence of elements being within a predetermined value, each of said matching errors corresponding to an insertion within the sequence for one or more elements of the located regular expression and being associated with a regular expression different from the located regular expression;
ascribing a group of elements in said sequence to the located regular expression if said located regular expression corresponds to said group but for the matching errors therein;
removing from the list the group of elements defined by the regular expression located;
leaving in said list those elements corresponding to said matching errors; and
repeating said approximate regular expression matching, said ascribing, said removing, and said leaving in for a next sequence of elements in said list of elements.

18. A computer-based system for automatically reconstructing a sequence of interventions by human operators on equipment, the system being configured for performing a method comprising:
recording in a log file events generated in the equipment as a result of the interventions performed by the operator, the events being recorded as sequences of elements in a list with each element having a timestamp, some of the events being superposed over each other in time;
defining regular expressions representative of potential interventions on said equipment;
approximate regular expression matching a sequence of elements in timestamp order in said list by locating an occurrence of one of said regular expressions in said list of elements with no more than said maximum number of matching errors and with the timestamps of said sequence of elements being within a predetermined value, said regular expressions being predefined and representative of potential interventions on said equipment, each of said matching errors corresponding to an insertion within the sequence for one or more elements of the located regular expression and being associated with a regular expression different from the located regular expression;
ascribing a group of elements in said sequence to the located regular expression if said located regular expression corresponds to said group but for the matching errors therein;
removing from the list the group of elements defined by the regular expression located;
leaving in said list those elements corresponding to said matching errors; and
repeating said approximate regular expression matching, said ascribing, said removing, and said leaving in for a next sequence of elements in said list of elements.

19. A non-transitory computer-readable medium containing a computer program product, loadable into the memory of at least one computer and comprising software code portions capable of performing a method of operating on a computer for automatically reconstructing a sequence of interventions by human operators on equipment, the method comprising:
recording in a log file events generated in the equipment as a result of the interventions performed by the operator, the events being recorded as sequences of elements in a list with each element having a timestamp, some of the events being superposed over each other in time;
defining regular expressions representative of potential interventions on said equipment;
approximate regular expression matching a sequence of elements in timestamp order in said list by locating an occurrence of one of said regular expressions in said list of elements with no more than said maximum number of matching errors and with the timestamps of said sequence of elements being within a predetermined value, said regular expressions being predefined and representative of potential interventions on said equipment, each of said matching errors corresponding to an insertion within the sequence for one or more elements of the located regular expression of being associated with a regular expression different from the located regular expression;
ascribing a group of elements in said sequence to the located regular expression if said located regular expression corresponds to said group but for the matching errors therein;

removing from the list the group of elements defined by the regular expression located;
leaving in said list those elements corresponding to said matching errors; and
repeating said approximate regular expression matching, said ascribing, said removing, and said leaving in for a next sequence of elements in said list of elements.

* * * * *